(12) United States Patent
Fest et al.

(10) Patent No.: US 9,726,524 B2
(45) Date of Patent: Aug. 8, 2017

(54) OPTICAL POSITION ENCODER

(71) Applicant: RAYTHEON COMPANY, Waltham, MA (US)

(72) Inventors: Eric C. Fest, Tucson, AZ (US); Page E. King, Tucson, AZ (US); Justan Forsyth, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 268 days.

(21) Appl. No.: 14/510,180

(22) Filed: Oct. 9, 2014

(65) Prior Publication Data

US 2016/0103000 A1    Apr. 14, 2016

(51) Int. Cl.
| | |
|---|---|
| *G01J 5/02* | (2006.01) |
| *G01D 5/30* | (2006.01) |
| *H04N 5/33* | (2006.01) |
| *G01D 5/34* | (2006.01) |

(52) U.S. Cl.
CPC .............. *G01D 5/30* (2013.01); *G01D 5/341* (2013.01); *H04N 5/33* (2013.01)

(58) Field of Classification Search
CPC ... G01D 5/30; G01D 5/341; G01J 5/02; G01J 5/08
USPC ............... 250/332, 347, 353, 338.1, 252.1
See application file for complete search history.

(56) References Cited

U.S. PATENT DOCUMENTS

| | | | |
|---|---|---|---|
| 4,270,048 A | 5/1981 | Liebing | |
| 5,247,173 A | 9/1993 | Benchetrit et al. | |
| 5,774,219 A | 6/1998 | Matsuura | |
| 6,975,408 B2 | 12/2005 | Igaki et al. | |
| 8,842,216 B2 | 9/2014 | Fest et al. | |

FOREIGN PATENT DOCUMENTS

| | | | |
|---|---|---|---|
| EP | 0206396 A1 | 12/1986 | |
| EP | 0206396 B1 * | 9/1990 | ............. G01B 11/26 |
| EP | 2492648 A2 | 8/2012 | |
| EP | 2511669 A2 | 10/2012 | |

OTHER PUBLICATIONS

International Search Report and Written Opinion in corresponding PCT Application No. PCT/US2015/041221 mailed Oct. 6, 2015.

* cited by examiner

*Primary Examiner* — David Porta
*Assistant Examiner* — Carolyn Igyarto
(74) *Attorney, Agent, or Firm* — Lando & Anastasi, LLP

(57) ABSTRACT

Optical position encoding mechanisms and methods for use in reimaged optical imaging systems. In one example, a reimaged optical imaging system includes an imaging detector, an optical component, and at least one light source coupled to the optical component and configured to be reimaged onto the imaging detector, wherein a position of an image of the at least one light source at the imaging detector encodes a position of the optical component relative to the imaging detector.

16 Claims, 4 Drawing Sheets

OPTICAL POSITION ENCODER

BACKGROUND

There are many reasons why it is important to know the position of a component in an optical system. For example, during assembly of a system or sub-system incorporating a component, it may be important to determine if the component is in the correct position. Similarly, during operation of an optical system, it may be desirable to determine whether a component has moved, or, for a moving component, to determine the position of the moving component. Conventionally, this is be done by attaching a separate opto- or electro-mechanical encoder to the component, which adds size, weight, power, and cost to the system.

SUMMARY OF INVENTION

Aspects and embodiments are directed to position sensing techniques in which an optical system's own detector is used to encode the position of a component within the optical system. As discussed in more detail below, in infrared optical systems, this encoder may be entirely passive.

According to one embodiment, a reimaged optical imaging system includes an imaging detector, an optical component, and at least one light source associated with the optical component and that is reimaged onto the imaging detector, wherein a position of an image of the at least one light source at the imaging detector encodes a position of the optical component relative to the imaging detector.

The optical component may be located approximately at an intermediate image plane of the reimaged optical imaging system. In one example, the optical component is a movable component configured to be selectively moved into and out of an optical path between the intermediate image plane and the imaging detector. In one example, the optical component is a filter. In one example, the imaging detector is a visible waveband sensor, and the at least one light source includes a light emitting diode having a wavelength in the visible spectrum. In another example, the imaging detector is a thermal imaging detector, and the at least one light source includes a reflector configured to reimage the thermal imaging detector onto itself. The thermal imaging detector may be a microbolometer or solid-state photovoltaic detector array, for example. The reimaged optical imaging system may further include a cold chamber, wherein the thermal imaging detector is located within the cold chamber. The reflector may include any of a V-groove, a corner cube, a spheric reflector, an aspheric reflector, or an alignment mask, for example.

According to another embodiment, a thermal reimaged optical imaging system includes a cold chamber, a thermal imaging detector disposed within the cold chamber, a first optical sub-system configured to receive and focus infrared electromagnetic radiation from a scene onto an intermediate image plane, a second optical sub-system configured to reimage the infrared electromagnetic radiation from the intermediate image plane onto the thermal imaging detector, a movable optical component configured to be movable into an out of an optical path of the thermal imaging detector, the movable optical component being located approximately at the intermediate image plane when in the optical path, and a reflector located on the movable optical component and configured to reimage the thermal imaging detector onto itself to thereby encode a position of the optical component relative to the thermal imaging detector.

In one example, the cold chamber is configured to cool or temperature stabilize the thermal imaging detector. The reflector may include any of a V-groove, a corner cube, a spheric reflector, an aspheric reflector, or an alignment mask, for example.

Another embodiment is directed to a method of determining a position of an optical component in a reimaged optical imaging system. The method may include receiving and focusing electromagnetic radiation from a scene onto an intermediate image plane, reimaging the electromagnetic radiation from the intermediate image plane onto an imaging detector configured to produce an image of the scene from the electromagnetic radiation, moving an optical component into an optical path of the imaging detector and proximate the intermediate image plane, the optical component having a light source attached thereto, and reimaging the light source onto the imaging detector, wherein a position of an image of the light source at the imaging detector encodes the position of the optical component relative to the imaging detector.

In one example, wherein the light source is a reflector and the imaging detector is a thermal imaging detector, reimaging the light source onto the imaging detector includes reimaging a reflection of the thermal imaging detector, reflected by the reflector, onto the thermal imaging detector. In another example, wherein the imaging detector is a visible waveband sensor, and the light source includes a light emitting diode, reimaging the light source onto the imaging detector includes emitting at least one wavelength in the visible spectrum from the light emitting diode, and producing an image of the at least one wavelength at the imaging detector.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

As discussed above, there are numerous instances where it is desirable to determine the position of a component in an optical system. For example, in some systems a component, such as a filter, may be moved into and out of the optical path using a shutter mechanism. In these systems, it may be desirable or necessary to accurately know the position of the component when it is moved into the optical path, specifically, its alignment relative to the optical axis or some other reference point. Aspects and embodiments are directed to mechanisms for determining the position (or alignment) of a component in an optical system relative to the system detector using the detector itself and without requiring a mechanical position encoder or angle resolver. In particular, certain embodiments use one or more light sources attached to the component whose position is to be determined that are reimaged onto the system detector, and thus encode the position of the component. As discussed in more detail below, the light sources may include one or more emitters (such as an LED) or reflectors that reimage an emitter on the detector. The position of the image(s) of the light source(s) on the detector encodes the position of the component.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
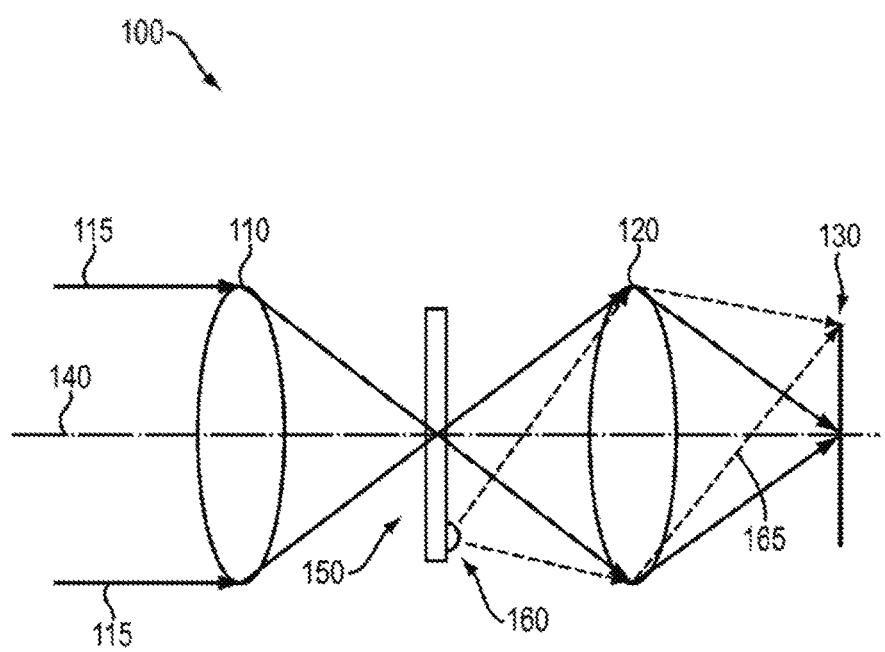
FIG. 1 is a schematic block diagram of one example of an optical system including a position encoder according to aspects of the invention.

Referring to FIG. 1, there is illustrated a schematic block diagram of one example of a reimaged optical system 100. The system includes a first optical sub-system 110 that receives electromagnetic radiation 115 from a scene and focuses the electromagnetic radiation onto an intermediate image plane (represented by the intersection of the two illustrated rays of the electromagnetic radiation 115). A second optical sub-system 120 relays and focuses the electromagnetic radiation 115 from the intermediate image plane onto an optical detector 130. Dotted line 140 represents the optical axis of the system 100, perpendicular (or normal) to the detector 130. Those skilled in the art will appreciate that each of the first and second optical sub-systems 110 and 120 may include one or more lenses and/or mirrors, or other optical components, configured to direct and focus the electromagnetic radiation 115. The detector 130 may be any type of optical detector, such as a focal plane array (FPA) visible or infrared imaging detector, for example.

The system 100 further includes a component 150 whose position is to be determined. In the example illustrated in FIG. 1, the component 150 is located approximately at the intermediate image plane of the system 100. As discussed above, a light source 160 is located on the component 150 and directs electromagnetic radiation 165 to the detector 130. The position of the light source 160 on the component 150 may be accurately established (for example, during manufacture or system set-up), such that the position of the image of the light source on the detector 130 may be used to accurately determine the position or alignment of the component 150 relative to the detector 130. The component 150 may be any type of component used in an optical system, such as a bandpass filter, polarizer, or other component. Generally, the detector 130 may not "see" the component 150, but instead images the electromagnetic radiation 115 from the scene as received through the component 150. Location of one or more light sources 160 on the component 150 may obscure objects in the scene being imaged by the detector; however, in many applications small obstructions in the image caused by the light source(s) 160 are tolerable and may not significantly degrade the imaging performance of the optical system 100.

As discussed above, in one example the light source 160 includes an emitter, such as a light emitting diode (LED). For example, the detector 130 may be a visible waveband sensor, and the light source 160 may be an LED emitting at a selected wavelength or wavelengths in the visible spectrum.

Figure 2:
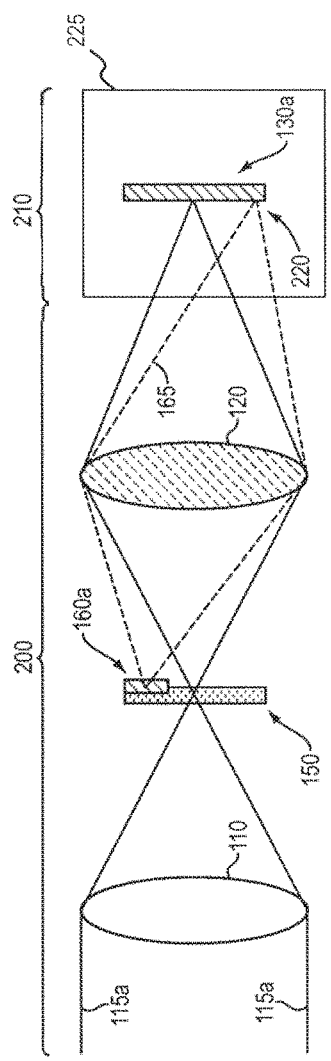
FIG. 2 is a reproduction of the optical system and position encoder of FIG. 1, illustrating an example of a warm according to aspects of the invention.

In another example, the light source 160 may be a reflector, such as a lens, mirror, or other reflective element, that reimages an emitter on the detector 130 back to the detector. In certain examples in which the optical system 100 is an infrared/thermal imaging system, the detector 130 itself may be the emitter. Referring to FIG. 2, in certain embodiments of thermal imaging systems, the detector 130a is a thermal imaging detector (such as an Indium Antimonide array) that is housed within a cold chamber 225, such as an Integrated Dewar Assembly (IDA), for example. Thus, the optical system includes a "warm" (typically ambient) sub-system 200 that generally includes the majority of the optical elements in the system, and which is not cooled, and a cold sub-system 210 that includes the thermal imaging detector 130a and any other components located within the cold chamber 225. Infrared electromagnetic radiation 115a from a scene is focused onto the thermal imaging detector 130a via the intermediate image plane by the first and second optical sub-systems 110, 120. In this example, a reflective feature 160a is located on the component 150 and reimages the cold detector 130a back onto itself. Thus, the detector 130a "sees" a cold image of itself, indicated at reference 220, retro-reflected from the reflector 160a. Typically, the optical system is imaging a scene at ambient temperatures (e.g., 250 or 300 Kelvin, average), and therefore the image of the cold detector 130a (which may be cooled to approximately 70-80 Kelvin) may be easily distinguished in the image obtained at the detector. In this case, the position encoding mechanism is entirely passive.

Figure 3A:
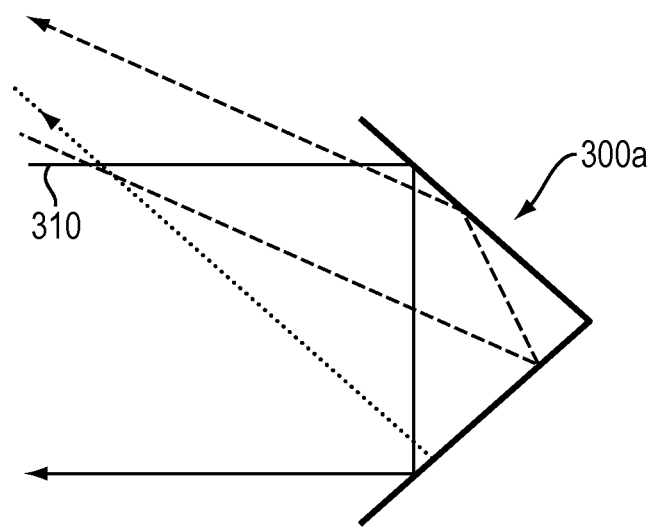
FIG. 3A is a schematic diagram of one example of a V-groove reflector.
Figure 3B:
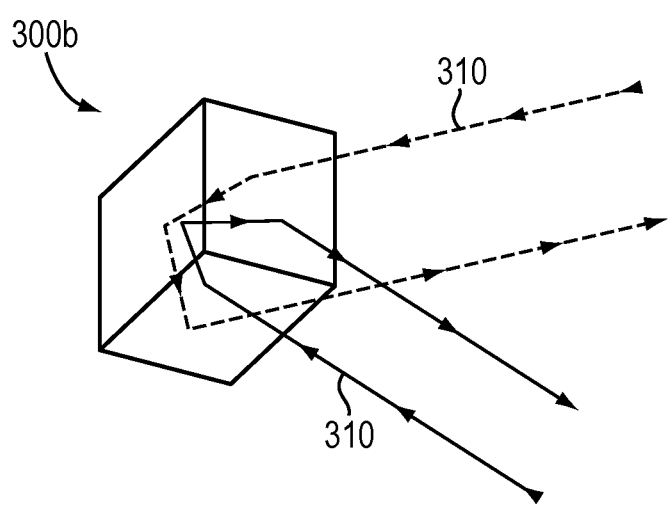
FIG. 3B is a schematic diagram of one example of a corner cube reflector.

In those embodiments in which the light source 160 is a reflector, the reflector may have any of numerous forms, provided that it is configured to retro-reflect an image of the detector 130 (or of another emitter attached to or collocated with the detector) back to the detector. For example, referring to FIG. 3A, the reflector 300a may include a V-groove that retro-reflects electromagnetic radiation 310 incident thereon. The V-groove reflector 300a reflects the incident electromagnetic radiation 310 back at the angle of incidence in two dimensions. In another example, the reflector 300b may include a retro-reflecting corner cube, as shown in FIG. 3B. The corner cube reflector 300b reflects the incident electromagnetic radiation 310 back at the angle of incidence in three dimensions. In other examples, the reflector may include a spheric or aspheric reflector or an alignment mask.

In each example, the reflector images the cold detector 130*a* back onto itself, creating a contrast in the thermal background.

As discussed above, in the examples illustrated in FIGS. 1 and 2, the component 150 is located at or near the intermediate image plane of the optical system. This arrangement may provide the easiest implementation of the optical position encoding mechanisms discussed herein, as the light source 160 may be directly reimaged onto the detector 130. However, in certain embodiments, it may be desirable to determine the position/alignment of a component that is not located at the intermediate image plane. According to one embodiment, the position of components that are not at intermediate images may be encoded onto the detector 130 by using a reflector (such as a lens or mirror) placed at the intermediate image to reflect light from an emitter on the component 150 whose position is to be encoded.

Figure 4:
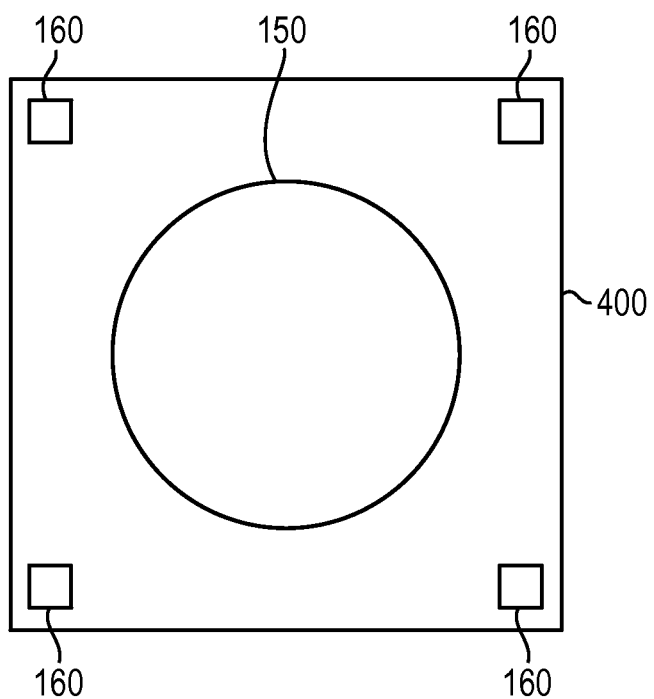
FIG. 4 is a schematic diagram of one example of a movable optical component and associated position encoding light sources according to aspects of the invention.

In certain examples, a single light source 160 (emitter or reflector) may be sufficient to act as a position encoder for the associated component, as discussed above. However, more accurate position information may be obtained by using two or more light sources 160, each configured to direct or retro-reflect light onto the detector 130. In some examples, the light source(s) 160 may be attached directly to the optical component 150. In other examples, such as where the optical component 150 is attached to a shutter or other platform that is movable into and out of the optical path, the light source(s) 160 may be attached to the platform. For example, referring to FIG. 4, there is illustrated a block diagram of one example of a movable platform 400 upon which is mounted the optical component 150 (e.g., a filter), with four light sources 160 positioned at the four corners of the platform. In other examples, any number of light sources 160 may be placed at various fixed locations on the platform 400 relative to the optical component 150.

Thus, aspects and embodiments provide an optical position encoder that can be easily incorporated with the component whose position is to be determined, and which leverages the existing system detector to obtain the position measurements. As discussed above, embodiments of the optical position encoder include one or more light sources associated with the component whose position is to be determined that are reimaged onto the detector, such that the position of the images of the sources on the detector encode the position of the associated component. Thus, the need for bulky, dedicated position measuring devices or angle resolvers is removed, and as discussed above, for infrared systems, the position encoder may be entirely passive.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A reimaged thermal optical imaging system comprising:
    a thermal imaging detector;
    an optical component; and
    at least one reflector positioned on the optical component, the at least one reflector being configured to reimage a reflection of the thermal imaging detector back onto the thermal imaging detector, wherein a position of the reimaged reflection on the thermal imaging detector encodes a position of the optical component relative to the thermal imaging detector.

2. The reimaged thermal optical imaging system of claim 1, wherein the optical component is located at an intermediate image plane of the reimaged optical imaging system.

3. The reimaged thermal optical imaging system of claim 2, wherein the optical component is a movable component configured to be selectively moved into and out of an optical path between the intermediate image plane and the imaging detector.

4. The reimaged thermal optical imaging system of claim 3, wherein the optical component is a filter.

5. The reimaged thermal optical imaging system of claim 1, wherein the thermal imaging detector is a microbolometer or solid-state photovoltaic detector array.

6. The reimaged thermal optical imaging system of claim 1, further comprising a cold chamber, and wherein the thermal imaging detector is located within the cold chamber.

7. The reimaged thermal optical imaging system of claim 1, wherein the reflector is one of a V-groove and a corner cube.

8. The reimaged thermal optical imaging system of claim 1, wherein the optical component is positioned between the thermal imaging detector and an intermediate image plane of the reimaged optical imaging system along an optical path that extends between the thermal imaging detector and the intermediate image plane, the optical component being located closer to the intermediate image plane than to thermal imaging detector.

9. The reimaged thermal optical imaging system of claim 8 further comprising:
    a first optical sub-system configured to receive electromagnetic radiation from a scene and focus the electromagnetic radiation onto the intermediate image plane; and
    a second optical sub-system positioned between the optical component and the thermal imaging detector, the second optical sub-system being configured to relay and focus the electromagnetic radiation from the intermediate image plane onto the thermal imaging detector.

10. A thermal reimaged optical imaging system comprising:
    a cold chamber;
    a thermal imaging detector disposed within the cold chamber;
    a first optical sub-system configured to receive and focus infrared electromagnetic radiation from a scene onto an intermediate image plane;
    a second optical sub-system configured to reimage the infrared electromagnetic radiation from the intermediate image plane onto the thermal imaging detector;
    a movable optical component configured to be movable into and out of an optical path of the thermal imaging detector, the movable optical component being located at the intermediate image plane when in the optical path; and
    a reflector located on the movable optical component and configured to reimage the thermal imaging detector onto itself to thereby encode a position of the optical component relative to the thermal imaging detector.

11. The thermal reimaged optical imaging system of claim 10, wherein the cold chamber is configured to cool or temperature stabilize the thermal imaging detector.

12. The thermal reimaged optical imaging system of claim 10, wherein the reflector is one of a V-groove and a corner cube.

13. The thermal reimaged optical imaging system of claim 10, wherein the movable optical component is a filter.

14. The thermal reimaged optical imaging system of claim 10, wherein the thermal imaging detector is a microbolometer or solid-state photovoltaic detector array.

15. A method of determining a position of an optical component in a reimaged optical imaging system, the method comprising:
   receiving and focusing electromagnetic radiation from a scene onto an intermediate image plane;
   reimaging the electromagnetic radiation from the intermediate image plane onto an imaging detector configured to produce an image of the scene from the electromagnetic radiation;
   moving an optical component into an optical path of the imaging detector and proximate the intermediate image plane, the optical component having a light source attached thereto; and
   reimaging the light source onto the imaging detector, wherein a position of an image of the light source at the imaging detector encodes the position of the optical component relative to the imaging detector.

16. The method of claim 15, wherein the light source is a reflector and the imaging detector is a thermal imaging detector, and wherein reimaging the light source onto the imaging detector includes reimaging a reflection of the thermal imaging detector, reflected by the reflector, onto the thermal imaging detector.

\* \* \* \* \*